United States Patent
Nekhay

(10) Patent No.: US 9,588,960 B2
(45) Date of Patent: Mar. 7, 2017

(54) AUTOMATIC EXTRACTION OF NAMED ENTITIES FROM TEXTS

(71) Applicant: ABBYY InfoPoisk LLC, Moscow (RU)

(72) Inventor: Ilya Nekhay, Moscow (RU)

(73) Assignee: ABBYY InfoPoisk LLC (RU)

(*) Notice: Subject to any disclaimer, the term of this patent is extended or adjusted under 35 U.S.C. 154(b) by 2 days.

(21) Appl. No.: 14/508,419

(22) Filed: Oct. 7, 2014

(65) Prior Publication Data

US 2015/0199333 A1    Jul. 16, 2015

(30) Foreign Application Priority Data

Jan. 15, 2014 (RU) ................. 2014101126

(51) Int. Cl.
  *G06F 17/27* (2006.01)
(52) U.S. Cl.
  CPC .......... *G06F 17/278* (2013.01); *G06F 17/271* (2013.01); *G06F 17/2755* (2013.01); *G06F 17/2785* (2013.01)
(58) Field of Classification Search
  None
  See application file for complete search history.

(56) References Cited

U.S. PATENT DOCUMENTS

| | | |
|---|---|---|
| 5,771,712 A | 6/1998 | Campbell et al. |
| 6,085,187 A | 7/2000 | Carter et al. |
| 6,512,522 B1 | 1/2003 | Miller et al. |
| 6,657,625 B1 | 12/2003 | Chik et al. |
| 6,661,417 B1 | 12/2003 | Cheng |
| 7,013,264 B2 | 3/2006 | Dolan et al. |
| 7,106,905 B2 | 9/2006 | Simske |
| 7,493,333 B2 | 2/2009 | Hill et al. |
| 7,496,593 B2 | 2/2009 | Gardner et al. |
| 7,505,989 B2 | 3/2009 | Gardner et al. |
| 7,668,791 B2 | 2/2010 | Azzam et al. |
| 7,739,218 B2 | 6/2010 | Argüello et al. |
| 7,912,849 B2 | 3/2011 | Øhrn et al. |
| 7,949,676 B2 | 5/2011 | Mori et al. |
| 7,991,760 B2 | 8/2011 | Kolz et al. |
| 8,014,997 B2 | 9/2011 | Huang et al. |
| 8,041,702 B2 | 10/2011 | Eggebraaten et al. |
| 8,065,655 B1 | 11/2011 | Deo et al. |
| 8,069,185 B2 | 11/2011 | Martin et al. |
| 8,140,535 B2 | 3/2012 | Eggebraaten et al. |
| 8,140,557 B2 | 3/2012 | Dettinger et al. |
| 8,145,579 B2 | 3/2012 | Iqbal et al. |

(Continued)

*Primary Examiner* — Qian Yang
(74) *Attorney, Agent, or Firm* — Veronica Weinstein

(57) ABSTRACT

Disclosed are systems, computer-readable mediums, and methods for extracting named entities from an untagged corpus of texts. Generating a set of attributes for each of the tokens based at least on a deep semantic-syntactic analysis. The set of attributes include lexical, syntactic, and semantic attributes. Selecting a subset of the attributes for each of the tokens. Retrieving classifier attributes and categories based on a trained model, wherein the classifier attributes are related to one or more categories. Comparing the subset of the attributes for each of the tokens with the classifier attributes. Classifying each of tokens to at least one of the categories based on the comparing. Generating tagged text based on the categorized tokens.

19 Claims, 12 Drawing Sheets

(56) References Cited

U.S. PATENT DOCUMENTS

| | | | |
|---|---|---|---|
| 8,209,295 | B2 | 6/2012 | Faraotti et al. |
| 8,225,380 | B2 | 7/2012 | Moshir et al. |
| D665,414 | S | 8/2012 | Lee et al. |
| 8,239,342 | B2 | 8/2012 | Ross et al. |
| 8,250,101 | B2 | 8/2012 | Fot et al. |
| 8,266,184 | B2 | 9/2012 | Liu et al. |
| 8,276,061 | B2 | 9/2012 | Joshi et al. |
| 8,285,711 | B2 | 10/2012 | Bordawekar et al. |
| 8,316,006 | B2 | 11/2012 | Cain et al. |
| 8,335,753 | B2 | 12/2012 | Rappaport et al. |
| 8,336,024 | B2 | 12/2012 | Kannan et al. |
| 8,484,141 | B2 | 7/2013 | Grabarnik et al. |
| 8,566,363 | B2 | 10/2013 | Fang et al. |
| 2004/0122656 | A1 | 6/2004 | Abir |
| 2005/0065773 | A1 | 3/2005 | Huang et al. |
| 2005/0154690 | A1 | 7/2005 | Nitta et al. |
| 2006/0100856 | A1 | 5/2006 | Kang et al. |
| 2008/0243479 | A1* | 10/2008 | Cafarella .......... G06F 17/30696 704/9 |
| 2009/0055381 | A1 | 2/2009 | Wu et al. |
| 2009/0091405 | A1 | 4/2009 | Cho et al. |
| 2009/0157385 | A1* | 6/2009 | Tian ................ G06F 17/28 704/9 |
| 2009/0157401 | A1 | 6/2009 | Bennett et al. |
| 2010/0161317 | A1 | 6/2010 | Au et al. |
| 2011/0043528 | A1 | 2/2011 | Solomonov et al. |
| 2011/0077936 | A1 | 3/2011 | Arumugam et al. |
| 2011/0137636 | A1* | 6/2011 | Srihari .............. G06F 17/2863 704/2 |
| 2011/0270604 | A1* | 11/2011 | Qi .................... G06F 17/271 704/9 |
| 2011/0270607 | A1 | 11/2011 | Zuev et al. |
| 2012/0109640 | A1 | 5/2012 | Anisimovich et al. |
| 2012/0150531 | A1* | 6/2012 | Bangalore .......... G06F 17/28 704/9 |
| 2012/0310926 | A1 | 12/2012 | Gannu et al. |
| 2013/0066921 | A1 | 3/2013 | Mark et al. |
| 2014/0114649 | A1 | 4/2014 | Zuev et al. |
| 2014/0358539 | A1* | 12/2014 | Rao .................... G10L 15/063 704/243 |

* cited by examiner

AUTOMATIC EXTRACTION OF NAMED ENTITIES FROM TEXTS

CROSS REFERENCE TO RELATED APPLICATIONS

This application claims the benefit of priority under 35 USC 119 to Russian Patent Application No. 2014101126, filed Jan. 15, 2014; the disclosure of which is incorporated herein by reference.

BACKGROUND

Named entity recognition (NER) systems are generally based on more general-purpose text analysis tools. The depth of analysis may vary from the surface lexical-morphological analysis to integration of a NER system with a text parser. The NER methods used can be divided into two basic categories: rule-based methods and methods that use a machine-learning approach.

SUMMARY

Figure 1A:
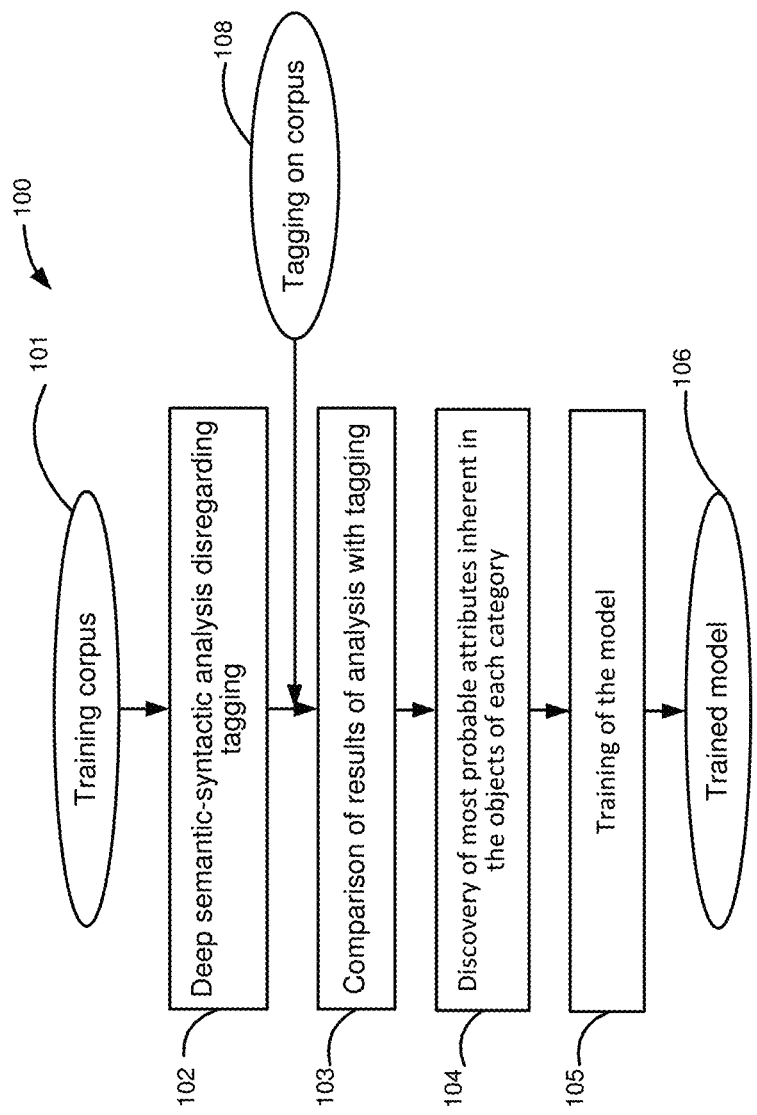
FIG. 1A illustrates operations for training using a tagged training corpus in accordance with one embodiment.

Disclosed are systems, computer-readable mediums, and methods for extracting tokens from an untagged corpus of texts. Generating a set of attributes for each of the tokens based at least on a deep semantic-syntactic analysis. The set of attributes include lexical, syntactic, and semantic attributes. Selecting a subset of the attributes for each of the tokens. Retrieving classifier attributes and categories based on a trained model, wherein the classifier attributes are related to one or more categories. Comparing the subset of the attributes for each of the tokens with the classifier attributes. Classifying each of tokens to at least one of the categories based on the comparing. Generating tagged text based on the categorized tokens.

DETAILED DESCRIPTION

This application relates to systems and methods of creating ontologies and semantic descriptions, in particular, extracting named entities (e.g., proper names) from unstructured texts. A special task of information extraction is named entity recognition (NER). This task consists of identifying the name boundaries of named entities (NE) in a text and assigning each entity a category, generally from a finite set of categories. Effective methods of this sort are required in software applications development and when solving a large number of natural language processing and document analysis tasks, such as machine translation, semantic indexing, semantic search, including, but not limited to, multilingual semantic search, fact extraction, sentiment analysis, document classification, similar document search, summarization, big data analysis, eDiscovery, etc. Deep text analysis present new opportunities for creating NER systems.

For each lexical token generated by a text semantic analyzer, for example the Compreno® parser, an extensive set of features is determined that can be used to develop rule-based systems. However, developing the rules is quite time-consuming. Use of statistical methods (given access to a sufficient quantity of data) can significantly reduce the laboriousness of solving certain tasks. The present disclosure adapts the statistical approach to NER using the results of the text semantic analyzer as the reference data.

Named entities are be understood to be unique names including, but not limited to, geographical designations (e.g., countries, settlements, streets), first names and surnames of persons, names of organizations or companies, and events (e.g., notable days, holidays, etc.). Because named entities can be out-of-vocabulary, not all named entities can be recognized by using a dictionary. Recognizing named entities can include, but is not limited to, identifying named entities in unstructured text, establishing boundaries, determining referential links, and assigning each named entity to an appropriate category. The assigned category can be selected from, for example, a finite set of categories.

The task of extracting named entities can be divided into two subtasks: detecting named entities and classifying the detected named entities. In addition, the quality of recognition and classification of the named entities can be rated.

The references from which named entities are extracted and classified can be annotated. The annotation can, for example, yield a tagged representation of the reference. For example, a reference sentence "Adams and Platt are both injured and will miss England's opening World Cup qualifier against Moldova on Sunday." can yield the following tagged (i.e., annotated) representation:

<PER>Adams</PER> and <PER>Platt</PER> are both injured and will miss <LOC>England</LOC>'s opening <EVENT>World Cup</EVENT> qualifier against <LOC>Moldova</LOC> on <DAY>Sunday</DAY>.

Thus, for example, the <PER> and </PER> tags can be used to identify people, specifically persons, <LOC> and </LOC> to identify geolocations, <EVENT> and </EVENT> to mark events, and <DAY> and </DAY> to identify and mark dates. New tags are added when the set of classification categories expands. In another example, qualifying tags can be added in addition to the category tags. For example, an event tag can include qualifiers such as, but not limited to, sporting event, anniversary celebration, premiere, film release, performance, product release, etc. A people tag can include qualifiers such as, but not limited to, politician, celebrity, writer, artist, etc. A location tag can include qualifiers such as, but not limited to, continent, country, capital, city, street, etc.

In an embodiment, an extractor can be trained using a tagged corpus. The tagged corpus can be a previously annotated reference, such as was shown above. A reference with multiple categories can be used. For example, the reference can include categories such as, but not limited to, people (PER), names of organizations (ORG), names of geolocations (LOC), and other named entities (MISC). A different set of reference categories can be created or there can be additional categories in the same reference. The categories used can be of different granularity or contain subcategories. For example, geolocations can be split into several subcategories: states, settlements, rivers, mountain ranges, etc.

FIG. 1A illustrates operations for training a parser using a tagged training text corpus (101). The training text corpus's (101) texts are split into tokens and each token can be assigned an appropriate category based on a tag assigned to the token. The tagged corpus can undergo a deep semantic-syntactic analysis (step 102) without regard to the existing markup. The deep semantic-syntactic analysis can yield attributes for words that were originally marked with selected categories. These attributes can be compared with the existing markup (step 103). The comparison of the attributes to the existing markup can be used to determine which attributes are inherent to objects in a given category.

The deep semantic-syntactic analysis of the tagged corpus (step 102) yields a rather large set of values of lexical, syntactic, and semantic attributes for each token. A subset of these values can be used to generate features for classification. In addition to using the lexical features for classification, the syntactic and semantic features can also be used for classification. In some embodiments, the necessary linguistic descriptions for the chosen language are available as a condition of use of the parser. The necessary linguistic descriptions can include, but are not limited to, lexical descriptions, morphological descriptions, syntactic descriptions, and semantic descriptions.

The quality of recognition and classification of the named entities can be rated. The rating operation can be chosen advance by, for example, a configuration setting of the parser or a selection by a user of the parser. For example, the well-known CoNLL method accounts for both classification precision and name boundary precision. Boundaries are understood to mean the boundaries of names (for example, a name consisting of several words).

In one embodiment, named entities with correctly determined boundaries and categories can be used to calculate the precision, recall, and F-score. For example, precision, P, and recall, R, can be calculated as:

$$P = \frac{\text{number of correctly idenified objects}}{\text{the number of idenified objects}}$$

$$R = \frac{\text{number of correctly idenified objects}}{\text{the number of objects}},$$

where the number of objects is the total number of objects that have been recorded in the system, i.e. lexical meanings contained in the semantic hierarchy. The rating also includes an F-score:

$$F = \frac{2PR}{P+R}.$$

In another embodiment, the following formula can also be used:

$$F_\beta = (1+\beta^2)\frac{PR}{(\beta^2 * P)+R},$$

where β is selected according to each specific task.

A classification feature set can be generated (step 104) based on the results of the comparison feature sets. A NER-system rating methodology based on measuring precision, recall, and F-score indicators can be used for the comparison. Integral estimates of F-score can be applied in comparative works. The integral estimate of F-score can be obtained through micro-averaging across all categories.

In an embodiment, a classification feature set can be generated during the training process by using the tagged corpus. The generated classification feature set can be used to train (105) an named entity model. The result is a trained model (step 106).

Figure 1B:
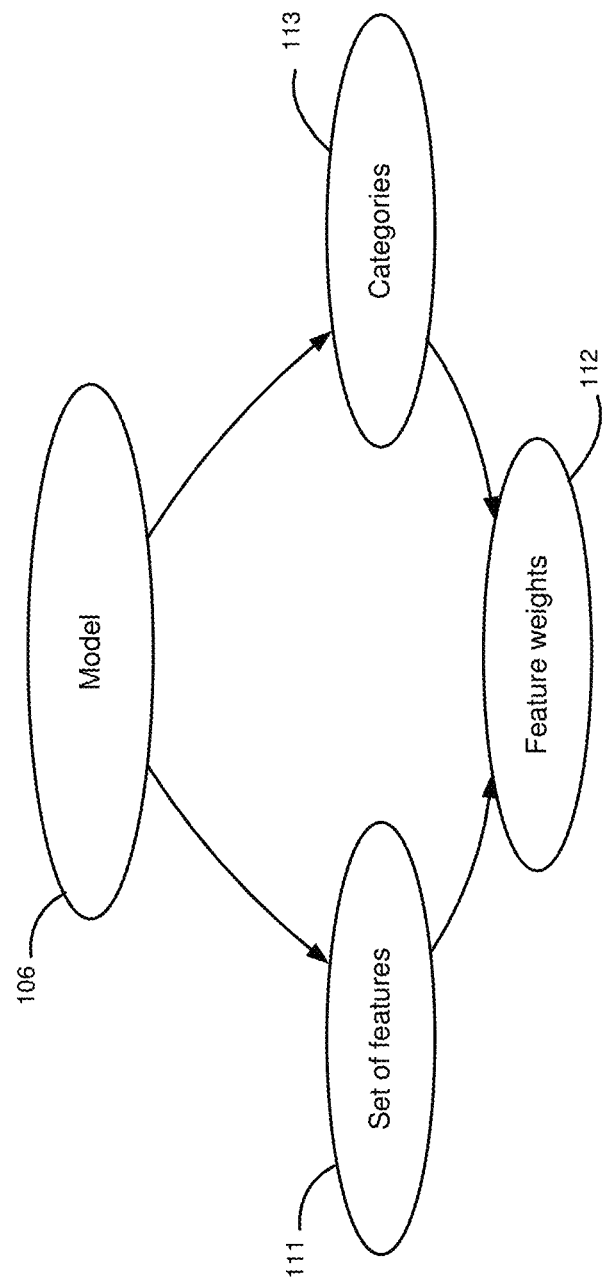
FIG. 1B shows a schematic representation of a trained model in accordance with one embodiment.

FIG. 1B shows a schematic representation of a trained model in accordinace with one embodiment. The trained model is the aggregate of the feature set (111) with the corresponding weights (112) relative to the classification categories (113). Additional models such as, but not limited to, conditional random fields (CRF), hidden Markov models (HMM), maximum-entropy Markov model (MEMM), or any similar model training method can also be used.

In one embodiment, "external" lists of named entities can be used. In another embodiment, "external" lists of named entities are not used, allowing the parser to be evaluated in "pure" form. If "external lists" are not used, then published values of the F-score that have been obtained by researchers without using external lists can be chosen for comparison with the results. All features used are local, e.g. consideration is only given to the current token, its closest line- and tree context, and the parent token (based on, for example, the parsing tree), which can be separated by a large distance in the text. Syntactic and semantic parameters selected during parsing can also be used.

In still another embodiment, non-local features and external data can be used; the non-local features and external data can include, for example, whether the token is ever lowercase, whether the token is tagged anywhere else in the set of documents, whether the token is in an external databases, etc.

Figure 1C:
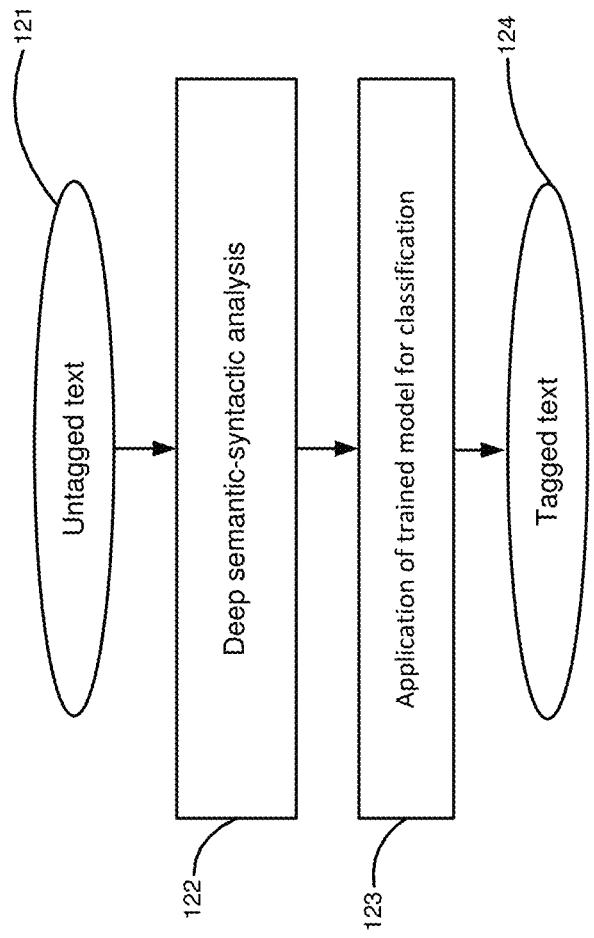
FIG. 1C illustrates operations for applying the trained model to a "new" untagged corpus in accordance with one embodiment.

FIG. 1C illustrates operations for applying the trained model to a "new" untagged corpus (121) in accordance with one embodiment. The untagged corpus also undergoes deep semantic-syntactic analysis (122) during which, for each token, a rather large set of values of lexical, syntactic, and semantic attributes are determined. Semantic and syntactic analysis (122) is explained in detail in U.S. Pat. No. 8,078,450 and is characterized by the use of a broad range of linguistic descriptions, including lexical, morphological, syntactic, and semantic categories and their values, which are internally extracted (i.e., discovered) during the analysis. A certain subset of the linguistic descriptions including lexical features, syntactic features, and semantic features can be used to generate the classifier's features. A description of the set of the mentioned linguistic descriptions and details of the individual stages of the semantic-syntactic analysis is given below.

Figure 2:
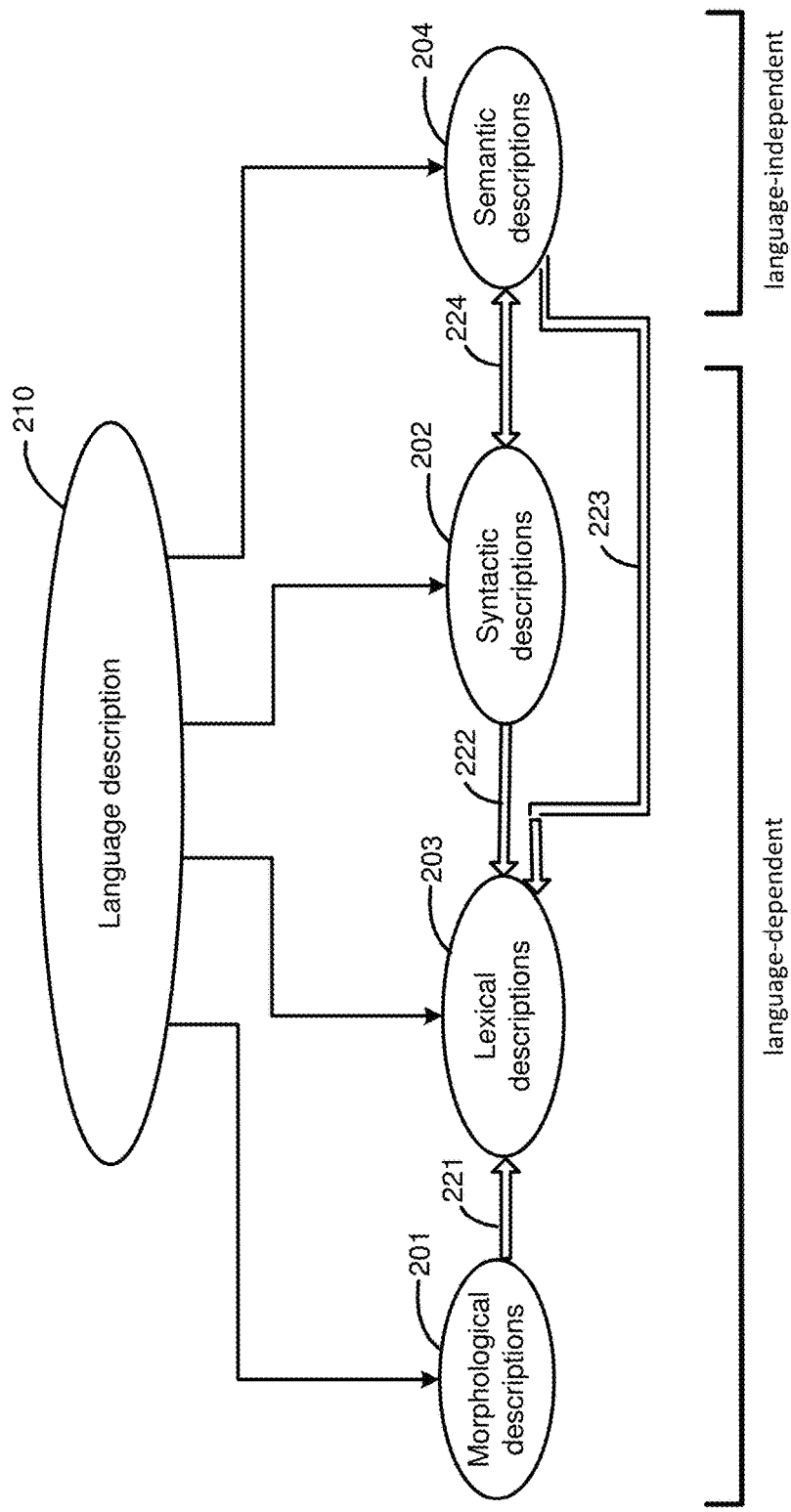
FIG. 2 is a chart illustrating language descriptions in accordance with one embodiment.

FIG. 2 is a chart illustrating language descriptions (210) in accordance with one embodiment. Language descriptions (210) can include, but are not limited to, morphological descriptions (201), syntactic descriptions (202), lexical descriptions (203) and semantic descriptions (204), and the relationship between the language descriptions. The morphological descriptions (201), the lexical descriptions (203), and the syntactic descriptions (202) can be language-specific. Each of the language descriptions (210) can be created for each source language and, taken together, the language descriptions represent a model of the source language. The semantic descriptions (204), however, can be language-independent and are used to describe language-independent semantic features of various languages and to construct language-independent semantic structures.

As shown in FIG. 2, the morphological descriptions (201), the lexical descriptions (203), the syntactic descriptions (202), and the semantic descriptions (204) are related. Lexical descriptions (204) and morphological descriptions (201) can be related by a link (221) indicating that a specified lexical meaning in the lexical description (230) has a morphological model represented as one or more grammatical values for the specified lexical meaning. For example, one or more grammatical values can be represented by different sets of grammemes in a grammatical system of the morphological descriptions (101).

In addition, as shown by link (222), a given lexical meaning in the lexical descriptions (203) can also have one or more surface models corresponding to the syntactic descriptions (202) for the given lexical meaning. As represented by link (223), the lexical descriptions (203) can be connected with the semantic descriptions (204). Therefore, the lexical descriptions (203) and the semantic descriptions (204) can be combined into "lexical-semantic descriptions", such as a lexical-semantic dictionary.

Link (224) is relationship between the syntactic descriptions (240) and the semantic descriptions (204). For examples, diatheses (417) of the syntactic descriptions (202) can be considered as the "interface" between the language-specific surface models and the language-independent deep models (512) of the semantic description (204).

Figure 3:
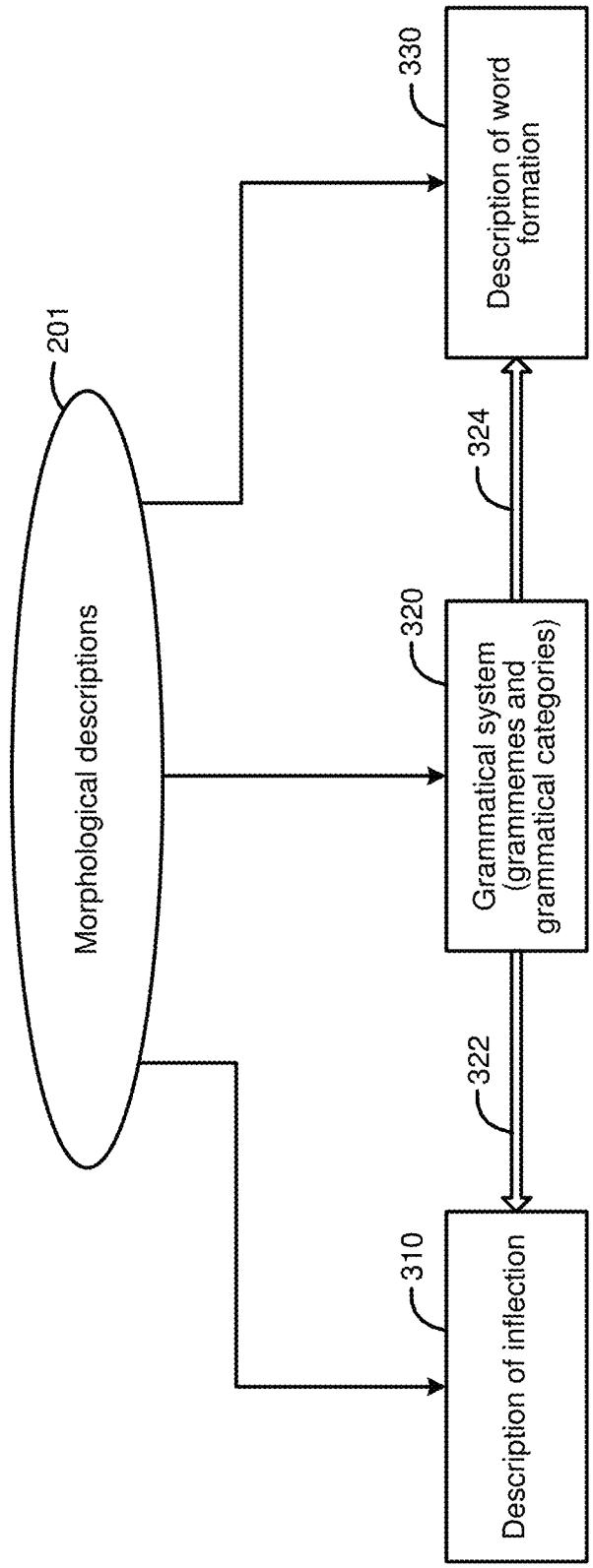
FIG. 3 is a chart illustrating morphological descriptions in accordance with one embodiment.

FIG. 3 is a chart illustrating morphological descriptions in accordance with one embodiment. The components of the morphological descriptions (201) include, but are not limited to, word-inflexion description (310), grammatical system (320), and word-formation description (330), among others. The grammatical system (320) is a set of grammatical categories, such as, but not limited to, "part of speech", "case", "gender", "number", "person", "reflexivity", "tense", "aspect", etc., and their meanings (hereafter referred to as "grammemes") including, for example, adjective, noun, verb, nominative, accusative, genitive, feminine, masculine, neuter, etc.

The word-inflexion description (310) describes how the main word form can change based on, for example, the word's case, gender, number, tense, etc. and broadly can include or describe all possible forms for this word. The word-formation (330) describes which new words can be generated involving this word (for example, there are a lot of compound words in German). The grammemes are units of the grammatical system (320) and, as shown by link (222) and link (324) in FIG. 3. The grammemes can be utilized to, for example, build the word-inflexion description (310) and the word-formation description 330.

In an embodiment, a constituent model is used to establish syntactic relationships for elements of a source sentence. A constituent can include a contiguous group of words in a sentence with the constituent acting as one entity. A constituent has a word at its core and can include child constituents at lower levels. A child constituent is a dependent constituent and can be attached to other constituents (as parent constituents) for building the syntactic structure of the source sentence.

Figure 4:
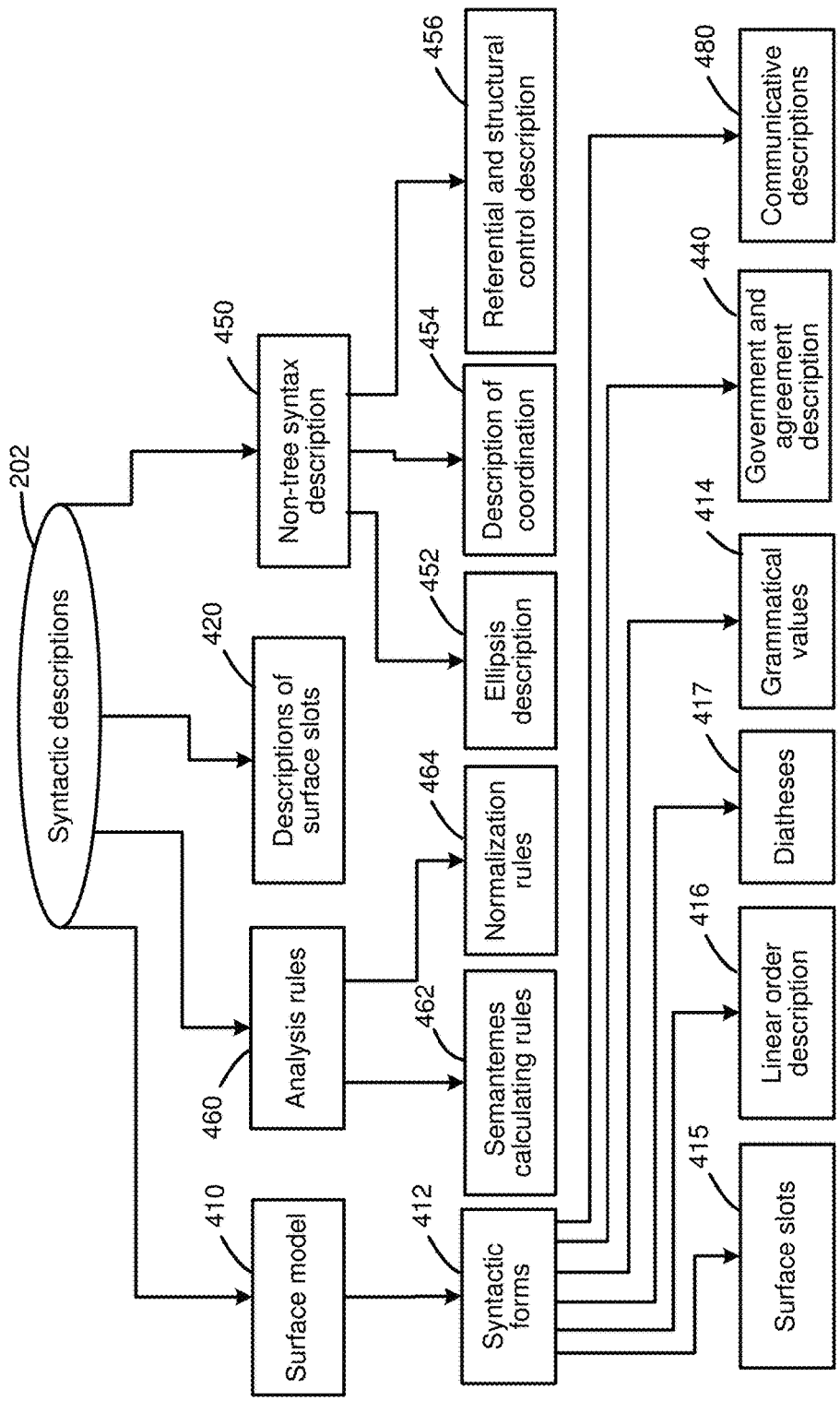
FIG. 4 is a chart illustrating syntactic descriptions in accordance with one embodiment.

FIG. 4 illustrates exemplary syntactic descriptions. The components of the syntactic descriptions (202) can include, but are not limited to, surface models (410), surface slot descriptions (420), referential and structural control descriptions (430), government and agreement descriptions (440), non-tree syntax descriptions (450), and analysis rules (460). The syntactic descriptions (202) can be used to construct possible syntactic structures of a source sentence from a given source language, taking into account free linear word order, non-tree syntactic phenomena (e.g., coordination, ellipsis, etc.), referential relationships, and other considerations.

The surface models (410) are represented as aggregates of one or more syntactic forms (i.e., "syntforms" (412)) in order to describe possible syntactic structures of sentences as included in the syntactic description (202). In general, the lexical meaning of a language is linked to their surface (syntactic) models (410), which represent constituents that are possible when the lexical meaning functions as a "core." The surface models (410) as represented by syntforms (412) can include a lexical meaning which functions as a "core" and can further include a set of surface slots (415) of its child constituents, a linear order description (416), diatheses (417), grammatical values (414), government and agreement descriptions (440), communicative descriptions (480), among others, in relationship to the core of the constituent.

The surface slot descriptions (420), as a part of syntactic descriptions (202), are used to describe general properties of the surface slots (415) that are used in surface models (410) of various lexical meanings in the source language. The surface slots (415) can be used to express syntactic relationships between the constituents of the sentence. Examples of the surface slot (415) can include "subject", "object_direct", "object_indirect", "relative clause", among others.

Figure 5:
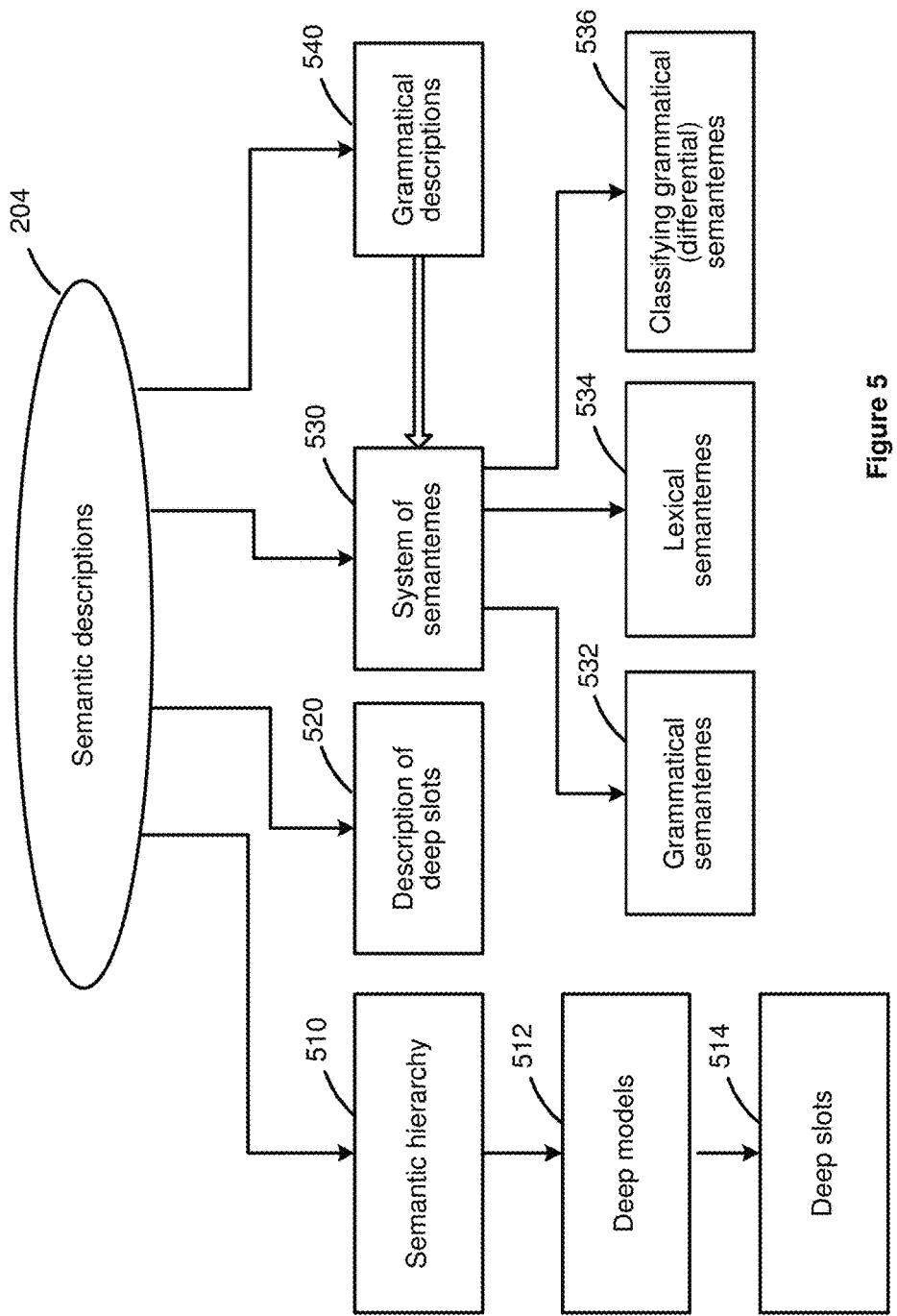
FIG. 5 is a chart illustrating semantic descriptions in accordance with one embodiment.

During the syntactic analysis, the constituent model utilizes a plurality of the surface slots (415) of the child constituents and their linear order descriptions (416) and describes the grammatical values (414) of the possible fillers of these surface slots (415). The diatheses (417) represent correspondences between the surface slots (415) and deep slots (514) (as shown in FIG. 5). The diatheses (417) are represented by the link (224) between syntactic descriptions (202) and semantic descriptions (204). The communicative descriptions (480) describe communicative order in a sentence.

The syntactic forms (syntforms) (412) are a set of the surface slots (415) coupled with the linear order descriptions (416). One or more constituents possible for a lexical meaning of a word form of a source sentence can be represented by surface syntactic models, such as the surface models (410). Every constituent is viewed as the realization of the constituent model by means of selecting a corresponding syntform (412). The selected syntforms (412) are sets of the surface slots (415) with a specified linear order. Every surface slot in a syntform can have grammatical and semantic restrictions on their fillers.

The linear order description (416) is represented as linear order expressions which are built to express a sequence in which various surface slots (415) can occur in the sentence. The linear order expressions can include names of variables, names of surface slots, parenthesis, grammemes, ratings, the "or" operator, etc. For example, a linear order description for the simple sentence of "boys play football," may be represented as "subject core object_direct", where "subject" and "object_direct" are names of surface slots (415) corresponding to the word order. Fillers of the surface slots (415) indicated by symbols of entities of the sentence are present in the same order for the entities in the linear order expressions.

Different surface slots (415) can be in a strict or variable relationship in the syntform (412). For example, parenthesis may be used to build the linear order expressions and describe strict linear order relationships between surface slots (415). For example, in another embodiment, SurfaceSlot1 SurfaceSlot2 or (SurfaceSlot1 SurfaceSlot2) mean that both surface slots are located in the same linear order expression, but only one order of these surface slots relative to each other is possible such that SurfaceSlot2 follows after SurfaceSlot1.

The square brackets can be used to build the linear order expressions and describe variable linear order relationships between surface slots (415) of the syntform (412). For example, [SurfaceSlot1 SurfaceSlot2] indicates that both surface slots belong to the same linear order expression, and their order relative to each other is not relevant.

The linear order expressions of the linear order description (416) can contain grammatical values (414), expressed by grammemes, to which child constituents should be corresponded. In addition, two linear order expressions can be joined by the operator | (<<OR>>). For example: (Subject Core Object)|[Subject Core Object].

The communicative descriptions (480) describe a word order in the syntform (412) from the point of view of communicative acts to be represented as communicative order expressions, which are similar to linear order expressions. The government and agreement description (440) contains rules and restrictions on grammatical values of attached constituents which are used during syntactic analysis.

The non-tree syntax descriptions (450) are related to processing various linguistic phenomena, such as, ellipsis and coordination, and are used in syntactic structures transformations which are generated during various steps of analysis according to embodiments of the present disclosure. The non-tree syntax descriptions (450) include ellipsis description (452), coordination description (454), and referential and structural control description (430), among others.

The analysis rules (460), as a part of the syntactic descriptions (202), can include, but are not limited to, semantemes calculating rules (462) and normalization rules (464). Although analysis rules (460) are used during the step of semantic analysis, the analysis rules (460) generally describe properties of a specific language and are related to the syntactic descriptions (202). The normalization rules (464) can be used as transformational rules to describe transformations of semantic structures which can be different in various languages.

FIG. 5 is a chart illustrating semantic descriptions in accordance with one embodiment. The components of the semantic descriptions (204) are language-independent and can include, but are not limited to, a semantic hierarchy (510), deep slots descriptions (520), a system of semantemes (530), and pragmatic descriptions (540).

The semantic hierarchy (510) are comprised of semantic notions (semantic entities) and named semantic classes arranged into hierarchical parent-child relationships similar to a tree. A child semantic class can inherit most properties of its direct parent and all ancestral semantic classes. For example, semantic class SUBSTANCE is a child of semantic class ENTITY and the parent of semantic classes GAS, LIQUID, METAL, WOOD_MATERIAL, etc.

Each semantic class in the semantic hierarchy (510) is supplied with a deep model (512). The deep model (512) of the semantic class is a set of the deep slots (514), which reflect the semantic roles of child constituents in various sentences with objects of the semantic class as the core of a parent constituent and the possible semantic classes as fillers of deep slots. The deep slots (514) express semantic relationships, including, for example, "agent", "addressee", "instrument", "quantity", etc. A child semantic class inherits and adjusts the deep model (512) of its direct parent semantic class.

The deep slots descriptions (520) are used to describe the general properties of the deep slots (514) and reflect the semantic roles of child constituents in the deep models (512). The deep slots descriptions (520) can also contain grammatical and semantic restrictions of the fillers of the deep slots (514). The properties and restrictions for the deep slots (514) and their possible fillers are very similar and often times identical among different languages. Thus, the deep slots (514) can be language-independent.

The system of semantemes (530) represents a set of semantic categories and semantemes which represent the meanings of the semantic categories. As an example, a semantic category, "DegreeOfComparison", can be used to describe the degree of comparison of adjectives, and its semantemes can be, for example, "Positive", "ComparativeHigherDegree", "SuperlativeHighestDegree", among others. As another example, a semantic category, "RelationToReferencePoint", can be used to describe an order as before or after a reference point and its semantemes may be, "Previous", "Subsequent", respectively, and the order may be spatial or temporal in a broad sense of the words being analyzed. As yet another example, a semantic category, "EvaluationObjective", can be used to describe an objective assessment, such as "Bad", "Good", etc.

The systems of semantemes (530) include language-independent semantic attributes which express not only semantic characteristics but also stylistic, pragmatic and communicative characteristics. Some semantemes can be used to express an atomic meaning which finds a regular grammatical or lexical expression in a language. By their purpose and usage, the system of semantemes (530) can be divided into various kinds, including, but not limited to, grammatical semantemes (532), lexical semantemes (534), and classifying grammatical (e.g., differentiating) semantemes (536).

The grammatical semantemes (532) can describe grammatical properties of constituents and are used when transforming a syntactic tree into a semantic structure. The lexical semantemes (534) can describe specific properties of objects (for example, "being flat" or "being liquid") and can be used in the deep slot descriptions (520) as restriction for deep slot fillers (for example, for the verbs "face (with)" and "flood", respectively). The classifying grammatical (differentiating) semantemes (536) express the differentiating properties of objects within a single semantic class. For example, in the semantic class HAIRDRESSER the semanteme <<RelatedToMen>> is assigned to the lexical meaning "barber", unlike other lexical meanings which also belong to this class, such as "hairdresser", "hairstylist", etc.

The pragmatic description (540) allows the system to assign a corresponding theme, style, or genre to texts and objects of the semantic hierarchy (510). For example, the assigned theme, style, or genre can include, but is not limited to, "economic policy", "foreign policy", "justice", "legislation", "trade", "finance", etc. Pragmatic properties can also be expressed by semantemes. For example, pragmatic context may be taken into consideration during the semantic analysis.

Figure 6:
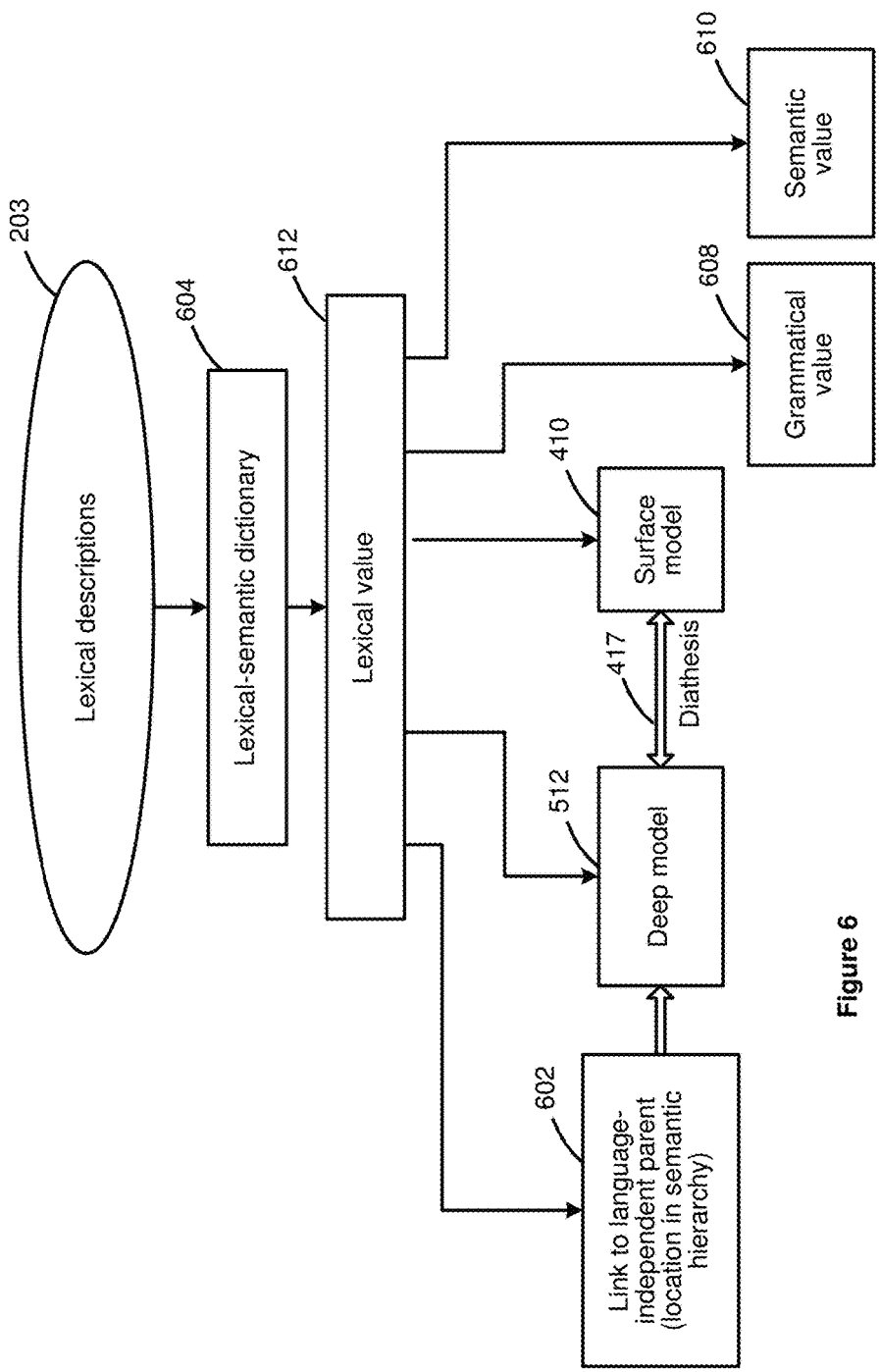
FIG. 6 is a chart illustrating lexical descriptions in accordance with one embodiment.

FIG. 6 is a chart illustrating lexical descriptions in accordance with one embodiment. The lexical descriptions (203) represent a plurality of lexical meanings (612) in a specific language. For each lexical meaning (612), a link (602) to its language-independent semantic parent is established to indicate the location of a given lexical meaning in the semantic hierarchy (510).

Each lexical meaning (612) is connected with its deep model (512), which is described in language-independent terms, and surface model (410), which is described in language-specific terms. Diatheses are used as the "interface" between the surface models (410) and the deep models (512). One or more diatheses (417) can be assigned to each surface slot (415) in each syntform (412) of the surface models (410).

While the surface model (410) describes the syntactic roles of surface slot fillers, the deep model (512) generally describes their semantic roles. A deep slot description (520) expresses the semantic type of a possible filler, reflects the real-world aspects of the situations, the properties or attributes of the objects denoted by words of any natural language. Each deep slot description (520) is language-independent since different languages use the same deep slot to describe similar semantic relationships or express similar aspects of the situations, and the fillers of the deep slots (514) generally have the same semantic properties even in different languages. Each lexical meaning (612) of a lexical description of a language inherits semantic class from its parent and adjusts its deep model (512).

In addition, the lexical meanings (612) can contain their own characteristics and can also inherit other characteristics from a language-independent parent semantic class. These characteristics of the lexical meanings (612) include grammatical values (608), which can be expressed as grammemes, and semantic value (610), which can be expressed as semantemes.

Every surface model (410) of a lexical meaning includes one or more syntforms (412). Every syntform, (412) of a surface model (410) can include one or more surface slots (415) with their linear order description (416), one or more grammatical values (414) expressed as a set of grammatical characteristics (grammemes), one or more semantic restrictions on surface slot fillers, and one or more of the diatheses (417). Semantic restrictions on a surface slot filler are a set of semantic classes, whose objects can fill this surface slot. The diatheses (417) are the part of relationship (224) between syntactic descriptions (202) and semantic descriptions (204), and represent correspondences between the surface slots (415) and the deep slots (514) of the deep model (512).

Returning to FIG. 1C, stage (122) consists of parsing each sentence in the text corpus (121) in accordance with the exhaustive semantic-syntactic analysis described in detail in U.S. Pat. No. 8,078,450. All of the described linguistic descriptions (210), including morphological descriptions (201), lexical descriptions (203), syntactic descriptions (202), and semantic descriptions (204) can be used to parse each sentence in the text corpus.

Figure 7A:
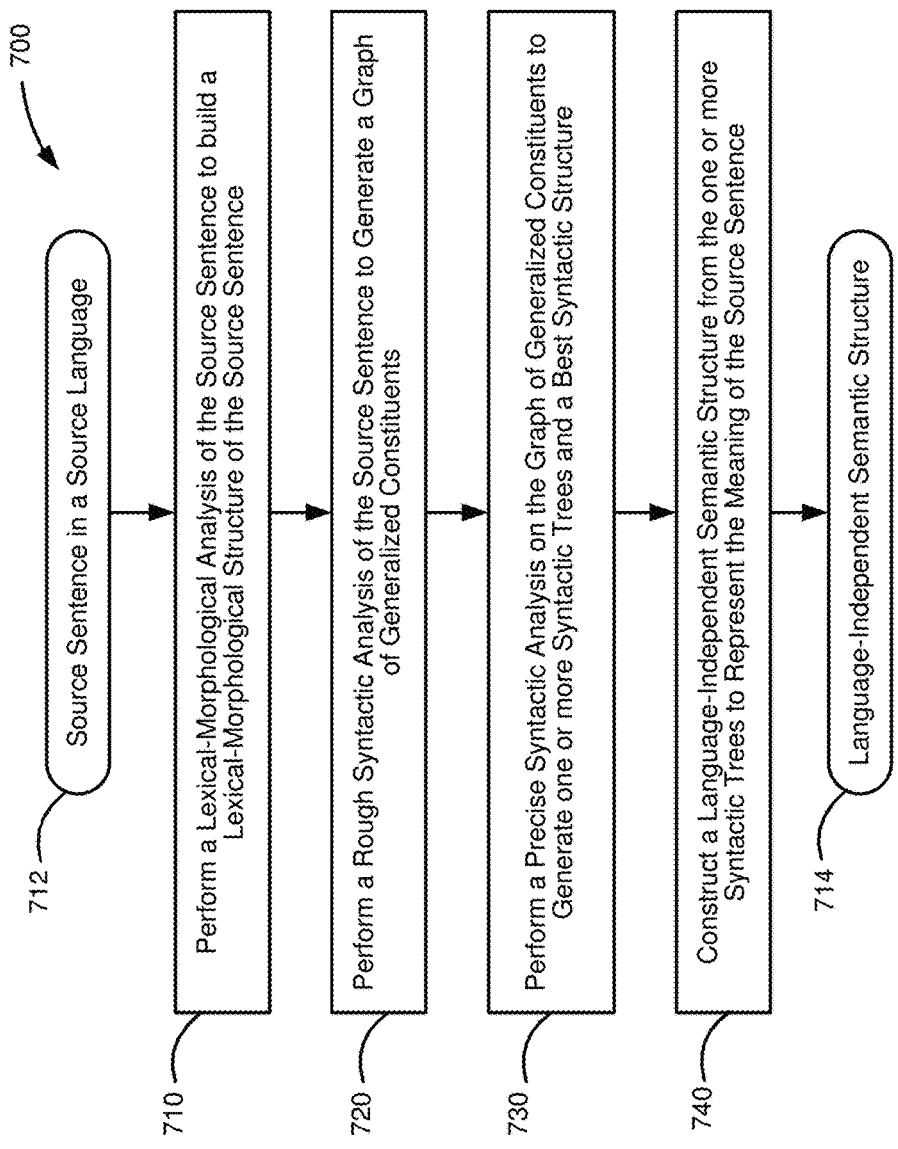
FIG. 7A illustrates the main stages of parsing each sentence in the text corpus in accordance with one embodiment.
Figure 7B:
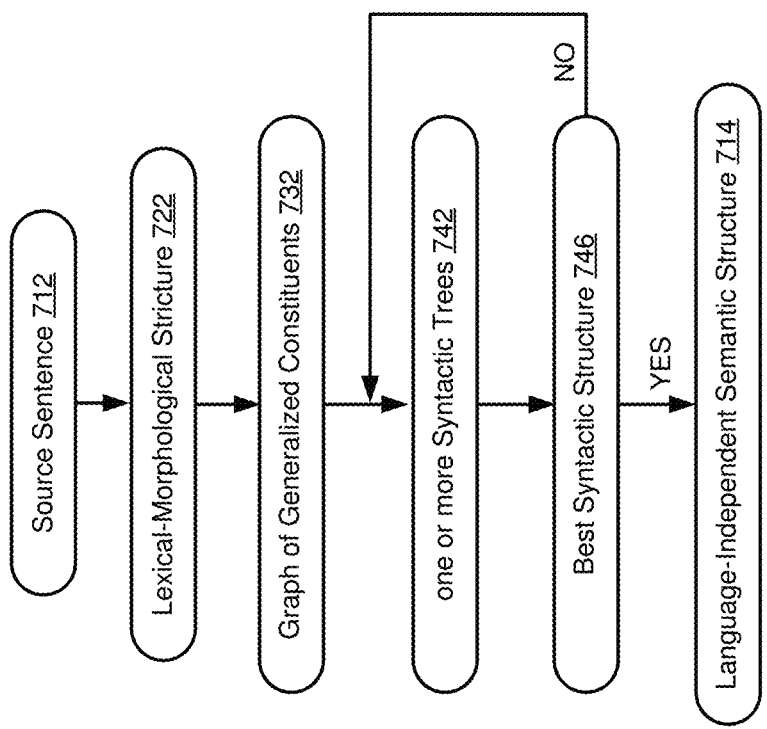
FIG. 7B shows the sequence of data structures built during the analysis process in accordance with one embodiment.

FIG. 7 illustrates the main stages of parsing each sentence in the text corpus in accordance with one embodiment. FIG. 7A shows the sequence of data structures built during the analysis process in accordance with one embodiment. At stage (710), the source sentence of the source language is subjected to a lexical-morphological analysis to build a lexical-morphological structure (722) of the source sentence. The lexical-morphological structure (722) is a set of all possible pairs of "lexical meaning-grammatical meaning" for each lexical element (word) in the sentence. With regards to extracting lexical-morphological features, the values obtained in this stage may not yet be used for classification because of variability due to the ambiguity of the lexical, morphological, and syntactic parsing. If the features obtained in this stage are used, the classification precision will likely not exceed that of ordinary systems that use only lexical features.

Then the lexical-morphological structure is analyzed using a rough syntactic analysis (720) of the source sentence is executed to generate a graph of generalized constituents (732). During rough syntactic analysis (720), for each element of the lexical-morphological structure (722), all the possible syntactic models for this lexical value are applied and checked to find all the potential syntactic links in the sentence, which is expressed in the graph of generalized constituents (732).

The graph of generalized constituents (732) is an acyclic graph in which the nodes are generalized (meaning that they store all the variants). Lexical values for words in the sentence are represented by nodes, and the branches are surface (syntactic) slots expressing various types of relationships between the combined lexical values. All possible surface syntactic models can be used for each element of the lexical-morphological structure of the sentence as a potential core for the constituents. Then all the possible constituents are built and generalized into a graph of generalized constituents (732). Correspondingly, all the possible syntactic models and syntactic structures for the source sentence (712) are examined, and a graph of generalized constituents (732) based on a set of generalized constituents can be constructed. The graph of generalized constituents (732) at the surface model level reflects all the potential relationships between words of the source sentence (713). Because the number of variations of a syntactic breakdown can be large in the general case, the graph of generalized constituents (732) can be excessive and has a great number of variations—both for selecting the lexical value for the node and for the surface slots for the graph branches.

For each "lexical value-grammatical value" pair, a surface model is initialized and additional constituents are added in the surface slots (415) of the syntform (412) of the surface model (410). For example, the neighboring constituents on the left and on the right can be added in the surface slots. The syntactic descriptions are shown in FIG. 4. If an appropriate syntactic form is found in the surface model (410) for the corresponding lexical value, the selected lexical value may serve as the core for a new constituent.

The graph of generalized constituents (732) is initially constructed as a tree, from the leaf nodes to the root (from bottom to top). Additional constituents are produced from bottom to top by adding child constituents to parent constituents by filling surface slots (415) of the parent constituents in order to cover all the initial lexical units of the source sentence (712).

The root of the tree, which is the graph's (732) main node, usually is a predicate. During this process, the tree can become a graph because the lower-level constituents can be included in various higher-level constituents. Some constituents that are constructed for the same constituents of the lexical-morphological structure can be generalized in order to produce generalized constituents. For example, constituents are generalized based on lexical values (612) or grammatical values (414), such as those based on parts of speech and the relationships between them.

Precise syntactic analysis (730) can be performed on the graph (732) to separate the syntactic tree (742) from the graph (732) of generalized constituents. One or more syntactic trees are constructed and, for each syntactic tree, an integral rating can be computed based on the use of a set of a priori and calculated ratings. The syntactic tree with the best rating can be selected to build the best syntactic structure (746) for the source sentence.

Figure 8:
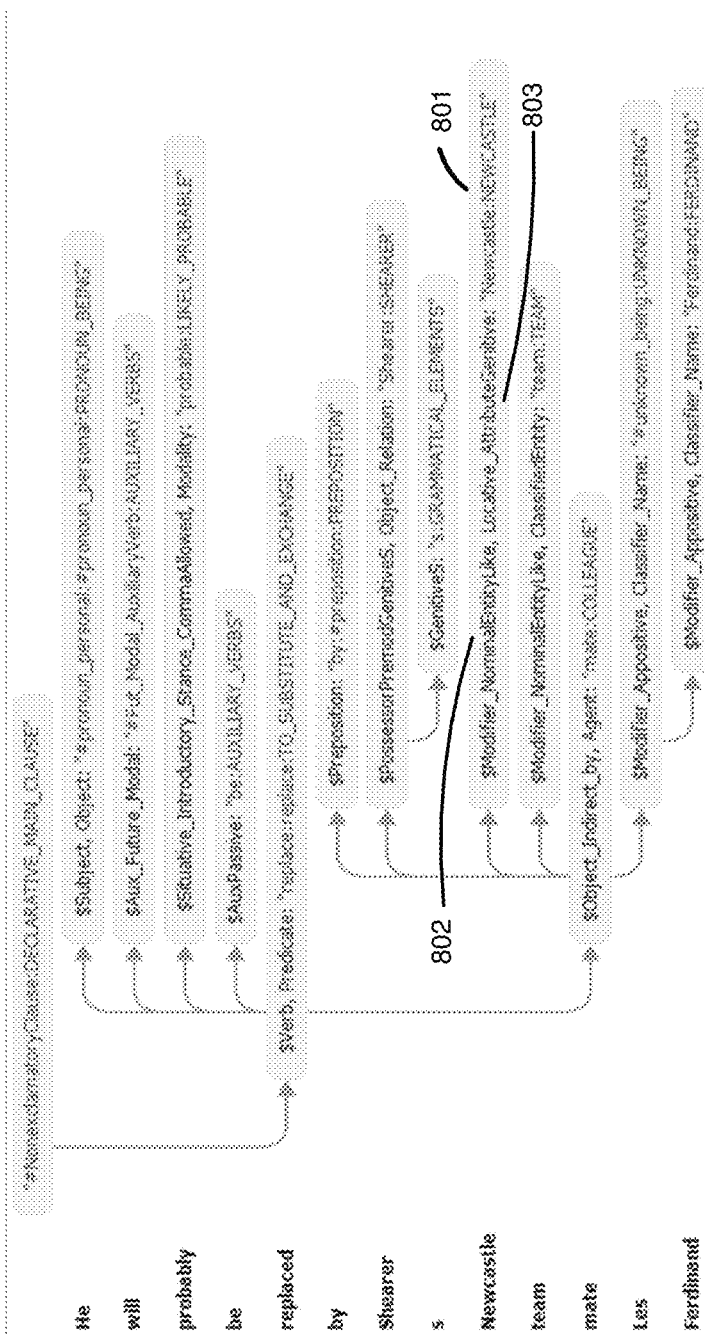
FIG. 8 illustrates an exemplary way to parse an English sentence semantically and syntactically in accordance with one embodiment.

FIG. 8 illustrates an exemplary way to parse an English sentence semantically and syntactically in accordance with one embodiment. For example, the English sentence, "He will probably be replaced by Shearer's Newcastle team mate Les Ferdinand," can be parsed semantically and syntactically. In one embodiment, the nodes of the tree shown in FIG. 8 correspond to the sentence's tokens, and the links to the syntactic relationships between them. Moreover, each node of the tree contains information about which semantic class the lexical value belongs to and which surface (syntactic) slot and which deep (semantic) slot the lexical value occupies in the parsing option. For example, for objects found in the semantic hierarchy, such as Newcastle (801), the name of a team, its membership in the semantic class NEWCASTLE is determined and that this token is a proper name: it fills a surface slot ($Modifier_NominalEntityLike, 802) in the syntactic structure, while in the semantic structure it fills a deep slot (LocativeAttributeGenitive, 803). If an appropriate lexical and semantic class is not determined for a particular token, then it is tagged with the semantic class UNKNOWN and surface and deep slots in the tree are chosen based on their current hypotheses as to the sentence's syntactic structure and the syntactic models of the other elements of the sentence that form the token's context.

The syntactic trees are generated as a process of advancing and verifying hypotheses about a possible syntactic structure for a sentence, wherein hypotheses about the structure of parts of the sentence are generated as part of the hypothesis about the structure of the entire sentence. During the conversion from the chosen tree to the syntactic structure (746), non-tree links are established. If non-tree links cannot be established, then the next highest-ranked syntactic tree is selected and an attempt is made to use it to establish non-tree links. The result of the precise analysis (730) is the optimal syntactic structure (746) for the sentence being analyzed.

In stage 740, a language-independent semantic structure (714) is generated that expresses the meaning of the sentence in universal language-independent concepts. The language-independent semantic structure of the sentence can be represented as an acyclic graph (trees, supplemented by non-tree links) where each word of a specific language can be replaced with universal (language-independent) semantic entities called semantic classes. The transition is performed using semantic descriptions (204) and analysis rules (460), which yield a structure in the form of a tree graph with a top node in which the nodes are semantic classes that have an attribute set (attributes express the lexical, syntactic, and semantic properties of specific words in the source sentence) and the arcs are deep (semantic) relationships between the words (nodes) they connect.

By selecting the optimal syntactic tree and building the semantic structure, ambiguity relating to a token of the sentence being parsed can be reduced based on a large set of morphological, lexical, syntactic, and semantic parameters that were extracted and refined during the analysis and values of the corresponding categories. A portion of the extracted parameters and values of the corresponding categories can be used as classification features.

In an embodiment, lexical features, such as, but not limited to, individual words, phrases, specific suffixes, prefixes, capital letters, etc., can be selected for use as classification features. The method of the linguistic approach can be used that allows to restrict using local textual features in favor of universal language-independent semantic and syntactic attributes extracted as result of deep semantic and syntactic analysis. Because of the universal language-independent nature of the semantic descriptions, the semantic and syntactic attributes have properties that can be portable across different text genres, subjects, and even languages in general. Moreover, the syntactic features that characterize links in a sentence make it possible to consider tokens that are not "nearby" in a sentence. This is important, for example, for the German language.

All features can be coded as string values and treated as booleans (true/false). Thus, all boolean features can be represented in the most natural way; each N-ary category feature is represented as a set of N boolean features. This approach eliminates the use of real-number features and significantly limits the use of whole-number features to only a relatively small set of values.

In one embodiment, features obtained by only a single parsing of each sentence (assumed to be the most accurate) can be used to simplify extracted attributes. For example, the "quantization" of attribute values can lead to the loss of essential information as well as to increased tolerance to overtraining. In another embodiment the parser's more detailed internal structures, such as syntactic or semantic structures, can be used. In still another embodiment alternate parsing options can also be analyzed. The features obtained can be of different type including, but not limited to:

Surface Lexical Features.

Surface lexical features which are determined from the description of tokens are character case features (WCASE: the first letter is capitalized, all letters are capitalized, . . . ) and adjusted case features, known as SHAPE in some sources. The value of SHAPE is generated as a result of a number of replacements. For example, capital letters are replaced by "X", lowercase letters are replaced by "x", and digits are replaced by "d". The results of the replacement of the first two and last two characters remain in their places; repetitions are removed from the remaining results and the characters themselves are sorted. For example, the token "Ireland-born" corresponds to the value "Xx-xxx" and the token "1996-02-12" corresponds to "dd-ddd". For example, WCASE is considered for the current and the previous token (e.g., in the range [−1 . . . 0]); SHAPE is considered for the two previous tokens and the current token (e.g., in the range [−2 . . . 0]).

Lexical Features.

Lexical features do not use external lists of named entities, however, lists of the most complete NE titles, for example those provided by the authors of the CoNLL-2003 corpus, can be used as a PART_OF_(MISC|ORG|PER|LOC) feature. The PART_OF_(MISC|ORG|PER|LOC) feature takes a logically true value if the current token is a part of an NE title present in the appropriate category of lists. To avoid overtraining on this feature, a randomly selected 50% of the titles from the lists can be used in the training stage, while 100% can be used in the testing stage. The feature can be applied to the current token.

Surface Morphological Features.

A parser can obtain a surface morphological feature by tagging of the parts of speech, represented by a POS feature, computed in the range [−1 . . . 0].

Surface Syntactic Features.

For each word, the parser can determine two syntactic attributes: a surface slot (SURFSL: Modifier_NominalEntityLike, Modifier_Attributive, Object_Indirect . . . ) and a simplified representation of the words syntactic role in the sentence (SYNTF: Subject, Preposition, Adverbial Modifier, . . . ). These features can be considered for the current token and for its parent (PAR_SURFSL, PAR_SYNTF) in the syntax parse tree. These features can be more dependent on the text's language than others features.

Deep Semantic Features.

The parser can use a semantic hierarchy (SH), where the SH is a tree whose nodes are semantic classes (SC) and whose leaf nodes are lexical classes (LC). For each word in the parsing, the parser can indicate the LC and several parent SCs in ascending order up the SH, from more specific classes to more general. This set of classes can be represented by the EXLEXCLASS feature. The value of this feature can be a vector of boolean values that correspond to each SC and indicate which SCs occur in the path from the lexical path up the SH (for example, soccer: FOOTBALL: TYPES_OF_GAMES: SPORT: AREA_OF_HUMAN_ACTIVITY). Moreover, there are various ways to "quantize" the SH. For example, the parser-defined attribute NearestSensibleParent (NSP) makes it possible to cut off a significant portion of the lists of similar, minor SCs in the SH. Its value would be TYPES_OF_GAMES in the 'soccer' example above. In another example, an artificially-included attribute ABR_EXLEXCLASS can be obtained by cutting off, from the path up along the SH, a lexical class and a number of SCs located in the hierarchy below specific classes from the given list (COUNTRY_BY_NAME, PERSON_BY_FIRSTNAME, etc.). The LEXCLASS_CONT attribute can be a set of boolean features determined by the presence, in the SH path to the word, of a number of manually selected SCs that best correlate with the named entity's category tags in the training set. The parser also provides a NOUN_TYPE classification attribute, which can divide nouns into proper nouns and common nouns.

The "quantization" of the SH can maintain balance between retaining essential training information and overtraining. For example, an optimal quantization can be one in which the most general SC, whose descendant SCs and LCs have some equivalence with respect to the problem being solved, is selected for each word.

Feature Combinations.

In some embodiments, features can be combined to yield better results. For example, a single feature with values (NOUN_TYPE=Common,WCASE=Lower), (NOUN_TYPE=Proper,WCASE=AllUpper), . . . contains more information than two features with values (Common, Proper, . . . ) and (Lower, AllUpper, . . . ) in a training conditional random fields (CRF) model based on a weighted sum of the feature values. On the other hand, the size of the set of values of combinations of several multivalued features can exceed the number of words in the training set, leading to overtraining of the classifier. Thus, in one embodiment, a subset of combinations can be selected for use. In additional embodiments, a different subset of combinations can be used.

Returning to FIG. 1C, the trained model can be used for classification (step 123). In an embodiment, the classification step can yield a text (124) tagged according to the entity categories identified by the trained model and the corresponding attributes. In addition, attributes generated from the untagged corpus of texts can be added to the values associated with one or more categories. For example, a token can be classified into the category of PERSON based on a subset of the attributes associated with the token. The remaining attributes, or a subset of the remaining attributes, can then be added as values for the category. Subsequent classification can make use of the added attributes when classifying additional tokens.

Automating feature generation can yield a large number of features. In an embodiment, a set of features can be selected to reduce the final feature set. Feature selection includes creating features based on available data and screening (subsets of) features. The screening methods can be subdivided into filters and wrappers. Filters can rank features by employing various correlation metrics to the feature values and the system's results. For example, filters can be adapted to specific training models.

Wrappers can deal with a trained model and and a feature set as "black box" and can train and estimate the model over various feature sets. In an embodiment, wrappers make it possible to avoid adapting the feature selection to the training model, which is a non-trivial problem. In solving NLP problems, feature selection is complicated by the fact that the size of the set of possible features reaches the hundreds and thousands. Reducing this set helps avoid overtraining, increases tolerance to subject domain changes in texts, decreases the systems' computational complexity, and facilitates understanding of the problem being solved.

Wrappers for NLP problems can be computationally intense, so several computers can be used in organizing the computations. In an embodiment, large-scale, distributed, scientific computing can be organized using a system such as BOINC, which possesses qualities such as platform independence, HTTP support, easy deployment, optimized data transfer, and the availability of off-the-shelf development tools.

Implementing wrappers using BOINC consists of the following: the code of the system being trained, the training and test text corpora, and a description of the task, including the feature set, are distributed to the computational nodes. The nodes train the system using the given corpus with the specified feature set, and test using the other corpus. Then the test results are sent to the central node.

Use of BOINC requires the description of a method to create new tasks and a method to process the results. The processed results can be saved in, for example, a database for later analysis.

The task creation algorithm can be defined by the chosen feature analysis method. The feature analysis method can include, for example, "greedy forward selection" and "greedy backwards exclusion." In a "greedy forward selection," each subsequent set of tasks results in the addition of a single feature at a time from the complete set to the best result of the previous iteration. In the "greedy backwards exclusion," a single feature at a time is excluded from the last iteration's set. Additional feature analysis can be used including, for example, those based on mutual information.

The feature analysis methods can discover the most powerful features (in the case of "forward" selection) or the features that are least informative relative to the rest of the set (in the case of "backward" exclusion), making it possible to design optimal named entity classifiers that are portable between various texts.

The portability of a machine-trained NER system across domains (corpora belonging to different time periods or pertaining to different subjects) in large part depends on feature selection. In some instances, transfer of features between domains can be unsuitable. For example, a recognized name's membership in a domain-dependent dictionary of names can be such a feature. In an embodiment, a ranking mechanism can be used to identify a portable, maximally precise, and minimally redundant feature set.

The ranking mechanism can rate an NER system's feature portability using, for example, two sets of texts obtained from different sources. Features can be ranked according to their portability based on a similarity measure. For example, the cosine of the angle between the probability distributions of the feature values for the given entity class can be used as a similarity measure.

The precision of a feature set can be determined based on mutual information for feature values and entity classes for features in the feature set. The mutual information between a class and the composite values of feature pairs can be computed to identify candidates for unification to obtain a feature with a broader set of values and a higher precision. The identified candidates and the obtained features can be subsequently rated with respect to portability.

In an embodiment, the mutual information between feature pairs can be computed to minimize redundancy. For example, one of a feature pair with high mutual information can be excluded from the training model. The presented selection method can yield F1-measure values of 75-80% when training an NER system on a corpus.

In another embodiment, the NER system's precision can be increased by including external named entity lists and non-local, document-level features (e.g., tags and metadata), and collections. In yet another embodiment, features in the line and tree contexts of the words can be included in the classifier. In another embodiment, the dependence of the cumulative F-score measure on the selection of features resulting from parsing text with a text parser can be simultaneously analyzed and used. The best results are obtained by tuning the feature set; no changes or adjustments for a specific corpus have been made to the training algorithm or to the parser.

In another embodiment, the classifier can be trained using a corpus in which all named entities are replaced with named entity titles. The entity titles can be used to investigate the role of semantic and syntactic features and classifier settings. To improve the algorithm of the parser for resolving ambiguity caused by unknown words during parsing the classifier can be trained using a corpus in which all named entities are replaced with named entity titles that deliberately aren't represented in the parser's semantic descriptions.

Figure 9:
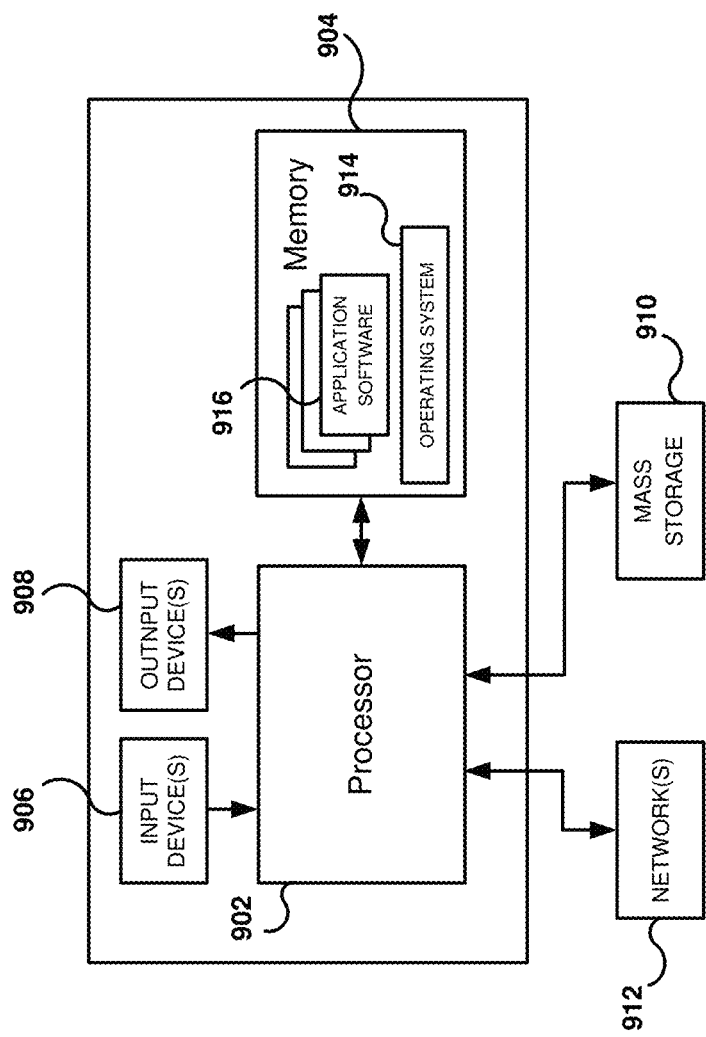
FIG. 9 shows an example of a computer platform that can be used in accordance with one embodiment.

FIG. 9 shows a possible example of a computer platform (900) that may be used to implement the described embodiments. The computer platform (900) includes at least one processor (902) connected to a memory (904). The processor (902) may be one or more processors and may contain one, two or more computer cores. The memory (904) may be RAM and may also contain any other types or kinds of memory, particularly non-volatile memory devices (such as flash drives) or permanent storage devices such as hard drives and so forth. In addition, an arrangement can be considered in which the memory (904) includes information-storage media physically located elsewhere within the computer facilities (900) such as cache memory in the processor (902), and memory used as virtual and stored on external or internal permanent storage (910).

The computer platform (900) also usually has a certain number of input and output ports to transfer information out and receive information. For interaction with a user, the computer platform (900) may contain one or more input devices (such as a keyboard, a mouse, a scanner, and other) and a display device (908) (such as a liquid crystal display). The computer facilities (900) may also have one or more permanent storage devices (910) such as an optical disk drive (CD, DVD, or other), a hard disk, or a tape drive. In addition, the computer facilities (900) may have an interface with one or more networks (912) that provide connections with other networks and computer equipment. In particular, this may be a local area network (LAN), a wireless Wi-Fi network and may or may not be joined to the World Wide Web (Internet). It is understood that the computer facilities (900) include appropriate analog and/or digital interfaces between the processor (902) and each of the components (904, 906, 908, 910 and 912).

The computer facilities (900) are managed by the operating system (914) and include various applications, components, programs, objects, modules and other, designated by the consolidated number 916.

In general, the routines executed to implement the embodiments may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations necessary to execute elements of disclosed embodiments. Moreover, various embodiments have been described in the context of fully functioning computers and computer systems, those skilled in the art will appreciate that the various embodiments are capable of being distributed as a program product in a variety of forms, and that this applies equally regardless of the particular type of computer-readable media used to actually effect the distribution. Examples of computer-readable media include but are not limited to recordable type media such as volatile and non-volatile memory devices, floppy and other removable disks, hard disk drives, optical disks (e.g., Compact Disk Read-Only Memory (CD-ROMs), Digital Versatile Disks (DVDs), flash memory, etc.), among others. Another type of distribution may be implemented as Internet downloads.

In the above description numerous specific details are set forth for purposes of explanation. It will be apparent, however, to one skilled in the art that these specific details are merely examples. In other instances, structures and devices are shown only in block diagram form in order to avoid obscuring the teachings.

Reference in this specification to "one embodiment" or "an embodiment" means that a particular feature, structure, or characteristic described in connection with the embodiment is included in at least one embodiment. The appearance of the phrase "in one embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

While certain exemplary embodiments have been described and shown in the accompanying drawings, it is to be understood that such embodiments are merely illustrative and not restrictive of the disclosed embodiments and that these embodiments are not limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principals of the present disclosure.

This description shows the basic inventive concept of the inventors, which cannot be limited by the hardware mentioned earlier. It should be noted that hardware is primarily intended to solve a narrow problem. As time goes by and as technology develops, such a task becomes more complex or it evolves. New tools arise that are capable of meeting new demands. In this sense, it is appropriate to look at this hardware from the point of view of a class of technical tasks they can solve, not simply as a technical implementation on some base of elements.

What is claimed is:

1. A method comprising:
   identifying, by a processor, a set of training texts;
   extracting, by the processor, a respective set of features for each of the training texts;
   training, by the processor, a classification model using the training texts and the extracted features;
   extracting, by the processor, a token from a natural language text;
   identifying, by the processor, a set of token attributes associated with the token based on a semantic-syntactic analysis of the natural language text, wherein the set of token attributes comprises at least one of a lexical attribute, a syntactic attribute, or a semantic attribute, and wherein the semantic-syntactic analysis of the natural language text comprises:
      generating, by the processor, a lexical-morphological structure of a sentence of the natural language text;
      identifying, by the processor, a syntactic tree using the lexical-morphological structure;
      generating, by the processor, a language-independent semantic structure based on the syntactic tree; and
      identifying, by the processor, the set of token attributes using the language-independent semantic structure;
   determining, by the processor, a category for the token based on the trained classification model and the set of token attributes; and
   generating, by the processor, a tagged representation of at least part of the natural language text, the tagged representation referencing the category for the token.

2. The method of claim 1, further comprising:
   ranking the set of token attributes; and
   identifying a first subset of the set of token attributes based on the ranking.

3. The method of claim 2, further comprising:
   determining a first rating of the trained classification model using the first subset of token attributes;
   identifying a second subset of the set of token attributes, wherein the second subset comprises the first subset of token attributes and an additional token attribute;
   determining a second rating of the trained classification model using the second subset of token attributes; and
   selecting one of the first subset of token attributes or the second subset of token attributes based on the first rating and the second rating.

4. The method of claim 3, wherein the first rating is based on at least one of: a precision score, a recall score, or an F-score.

5. The method of claim 2, further comprising:
   determining a first rating of the trained classification model using the first subset of token attributes;
   identifying a second subset of the set of token attributes, wherein a number of token attributes in the second subset of token attributes is less than a number of token attributes in the first subset of token attributes;
   determining a second rating of the trained classification model using the second subset of token attributes; and
   selecting one of the first subset of token attributes or the second subset of token attributes based on the first rating and the second rating.

6. The method of claim 5, wherein the first rating is based on at least one of: a precision score, a recall score, or an F-score.

7. The method of claim 1, further comprising combining a first token attribute and a second token attribute to form a third token attribute.

8. The method of claim 1, wherein identifying the syntactic tree further comprises:
   identifying a plurality of syntactic links in the natural language text using the lexical-morphological structure;
   identifying a plurality of syntactic trees based on the syntactic links;
   determining integral ratings of the plurality of syntactic trees; and
   identifying the syntactic tree based on the integral ratings.

9. A system comprising:
   a memory to store a natural language text; and
   a processor, operatively coupled to the memory, to:
      identify a set of training texts;
      extract a respective set of features for each of the training texts;
      train a classification model using the training texts and the extracted features;
      extract a token from the natural language text;
      identify a set of token attributes associated with the token based on a semantic-syntactic analysis of the natural language text, wherein the set of token attributes comprises at least one of a lexical attribute, a syntactic attribute, or a semantic attribute, and wherein to perform the semantic-syntactic analysis of the natural language text, the processor is to:
         generate a lexical-morphological structure of a sentence of the natural language text;
         identify a syntactic tree using the lexical-morphological structure;
         generate a language-independent semantic structure based on the syntactic tree; and
         identify the set of token attributes using the language-independent semantic structure;
      determine a category for the token based on the trained classification model and the set of token attributes; and
      generate a tagged representation of the natural language text, the tagged representation referencing the category for the token.

10. The system of claim 9, wherein the processor is further to:
    determine a first rating of the trained classification model using a first subset of the set of token attributes;
    identify a second subset of the set of token attributes, wherein the second subset comprises the first subset of token attributes and an additional token attribute;
    determine a second rating of the trained classification model using the second subset of token attributes; and select one of the first subset of token attributes or the second subset of token attributes based on the first rating and the second rating.

11. The system of claim 9, wherein to identify the syntactic tree comprises:
identifying a plurality of syntactic links in the natural language text using the lexical-morphological structure;
identifying a plurality of syntactic trees based on the syntactic links;
determining integral ratings of the plurality of syntactic trees; and
identifying the syntactic tree based on the integral ratings.

12. The system of claim 10, wherein the first rating is based on at least one of: a precision score, a recall score, or an F-score.

13. The system of claim 9, wherein the processor is further to:
rank the set of token attributes; and
identify a first subset of the set of token attributes based on the ranking.

14. A non-transitory computer readable medium having executable instructions stored thereon, the instructions causing a processor to:
identify a set of training texts;
extract a respective set of features for each of the training texts;
train a classification model using the training texts and the extracted features;
extract a token from a natural language text;
identify a set of token attributes associated with the token based on a semantic-syntactic analysis of the natural language text, wherein the set of token attributes comprises at least one of a lexical attribute, a syntactic attribute, or a semantic attribute, and wherein to perform the semantic-syntactic analysis of the natural language text, the processor is to:
generate a lexical-morphological structure of a sentence of the natural language text;
identify a syntactic tree using the lexical-morphological structure;
generate a language-independent semantic structure based on the syntactic tree; and
identify a set of token attributes using the language-independent semantic structure;
determine a category for the token based on the set of token attributes and the trained classification model; and
generate a tagged representation of the natural language text, the tagged representation referencing the category for the token.

15. The non-transitory computer-readable medium of claim 14, further comprising executable instructions causing the processor to:
determine a first rating of the trained classification model using a first subset of the set of token attributes;
identify a second subset of the set of token attributes, wherein the second subset comprises the first subset of token attributes and an additional token attribute;
determine a second rating of the trained classification model using the second subset of token attributes; and
select one of the first subset of token attributes or the second subset of token attributes based on the first rating and the second rating.

16. The non-transitory computer-readable medium of claim 14, further comprising executable instructions causing the processor to:
identify a plurality of syntactic links in the natural language text using the lexical-morphological structure;
identify a plurality of syntactic trees based on the syntactic links;
determine integral ratings of the plurality of syntactic trees; and
identify the syntactic tree based on the integral ratings.

17. The non-transitory computer-readable medium of claim 14, wherein to identify the syntactic tree comprises:
identifying a plurality of syntactic links in the natural language text using the lexical-morphological structure;
identifying a plurality of syntactic trees based on the syntactic links;
determining integral ratings of the plurality of syntactic trees; and
identifying the syntactic tree based on the integral ratings.

18. The non-transitory computer-readable medium of claim 15, wherein the first rating is based on at least one of: a precision score, a recall score, or an F-score.

19. The non-transitory computer-readable medium of claim 14, further comprising executable instructions causing the processor to:
rank the set of token attributes; and
identify a first subset of the set of token attributes based on the ranking.

* * * * *